United States Patent
Madpur et al.

(10) Patent No.: US 10,552,169 B2
(45) Date of Patent: Feb. 4, 2020

(54) ON-DIE SIGNAL CALIBRATION

(71) Applicant: SanDisk Technologies LLC, Plano, TX (US)

(72) Inventors: Ravindra Arjun Madpur, Bangalore (IN); Amandeep Kaur, Bangalore (IN)

(73) Assignee: SANDISK TECHNOLOGIES LLC, Addison, TX (US)

( * ) Notice: Subject to any disclaimer, the term of this patent is extended or adjusted under 35 U.S.C. 154(b) by 219 days.

(21) Appl. No.: 15/708,121

(22) Filed: Sep. 18, 2017

(65) Prior Publication Data
US 2018/0267810 A1 Sep. 20, 2018

(30) Foreign Application Priority Data
Mar. 17, 2017 (IN) .............................. 201721009431

(51) Int. Cl.
*G06F 9/4401* (2018.01)
(52) U.S. Cl.
CPC .................. *G06F 9/4401* (2013.01)
(58) Field of Classification Search
None
See application file for complete search history.

(56) References Cited

U.S. PATENT DOCUMENTS

| | | | |
|---|---|---|---|
| 6,002,282 A * | 12/1999 | Alfke | G06F 1/10 327/149 |
| 6,310,506 B1 | 10/2001 | Brown | |
| 6,370,200 B1 | 4/2002 | Takahashi | |
| 6,400,197 B2 | 6/2002 | Lai et al. | |
| 6,560,716 B1 | 5/2003 | Gasparik et al. | |
| 6,661,717 B1 | 12/2003 | Gomm et al. | |
| 6,763,444 B2 | 6/2004 | Thomann et al. | |
| 7,069,458 B1 | 6/2006 | Sardi et al. | |
| 7,095,789 B2 | 8/2006 | Ware et al. | |
| 7,187,598 B1 * | 3/2007 | Daugherty | G06F 13/1689 365/189.15 |

(Continued)

FOREIGN PATENT DOCUMENTS

| | | |
|---|---|---|
| CN | 104716946 A | 6/2015 |
| TW | 341676 | 10/1998 |

OTHER PUBLICATIONS

TW Patent Application No. 106143655 Notice of Allowance and search report dated Oct. 9, 2018.

(Continued)

*Primary Examiner* — Paul Yen
(74) *Attorney, Agent, or Firm* — Vierra Magen Marcus LLP

(57) ABSTRACT

Apparatuses, systems, methods, and computer program products are disclosed for on-die signal calibration. A calibration circuit on an integrated circuit device receives data from an active data path of the integrated circuit device and detects a variation in the received data from a calibration data pattern. An adjustment circuit on an integrated circuit device reduces a delay of an active data path of the integrated circuit device in response to detecting a first variation in received data. An adjustment circuit on an integrated circuit device increases a delay of an active data path of the integrated circuit device in response to detecting a second variation in received data.

20 Claims, 9 Drawing Sheets

(56) References Cited

U.S. PATENT DOCUMENTS

| | | | |
|---|---|---|---|
| 8,046,541 B1* | 10/2011 | Dolev | G06F 13/1694 |
| | | | 711/154 |
| 8,116,155 B2 | 2/2012 | Baek | |
| 8,565,034 B1* | 10/2013 | Lu | G06F 13/1689 |
| | | | 365/189.05 |
| 9,401,189 B1 | 7/2016 | Ding et al. | |
| 2012/0216095 A1* | 8/2012 | Ha | G06F 11/1004 |
| | | | 714/758 |
| 2012/0259438 A1 | 10/2012 | Momoi et al. | |
| 2015/0194083 A1* | 7/2015 | Sinha | G09G 3/007 |
| | | | 345/212 |

OTHER PUBLICATIONS

JP Patent Application No. 2017-239092 Reasons for Rejection dated Mar. 12, 2019.

* cited by examiner

ON-DIE SIGNAL CALIBRATION

CROSS-REFERENCES TO RELATED APPLICATIONS

This application claims the benefit of Indian Provisional Patent Application Number 201721009431 entitled "ON-DIE SIGNAL CALIBRATION" and filed on Mar. 17, 2017 for Ravindra Arjun Madpur et al., which is incorporated herein by reference in its entirety, for all purposes.

TECHNICAL FIELD

The present disclosure, in various embodiments, relates to signal calibration and more particularly relates to setup time and/or holdup time calibration for one or more integrated circuit devices.

BACKGROUND

As the speed of integrated circuit devices increases, the timing requirements also increase. For example, the input setup and hold times of data with respect to a clock signal may have strict requirements, or errors may occur. Satisfying timing requirements can be even more difficult in systems with multiple integrated circuit devices, especially if they share the same bus and/or controller.

SUMMARY

Apparatuses are presented for on-die signal calibration. In one embodiment, an on-die controller is disposed on an integrated circuit device. An on-die controller, in certain embodiments, includes a calibration circuit that receives data from an active data path of an integrated circuit device and detects a variation in the received data from a calibration data pattern. An adjustment circuit, in one embodiment, reduces a delay of an active data path of an integrated circuit device in response to detecting a first variation in received data. In certain embodiments, an adjustment circuit increases a delay of an active data path of an integrated circuit device in response to detecting a second variation in received data.

Other apparatuses are presented for on-die signal calibration. In one embodiment, an apparatus includes means for tapping calibration data from a data buffer at an end of an active data path of a memory device in response to a calibration command. An apparatus, in certain embodiments, includes means for detecting a variation between tapped calibration data and a calibration data pattern. An apparatus, in one embodiment, includes means for adjusting a delay of an active data path based on a detected variation.

Systems are presented for on-die signal calibration. In one embodiment, a device controller is configured to send a calibration command and calibration data. An array of memory elements, in certain embodiments, is in communication with a device controller. Memory elements of an array, in one embodiment, include different active data paths between different input/output pads and a memory buffer. In certain embodiments, memory elements of an array are configured to tap a memory buffer to detect different variations in calibration data from different active data paths. In one embodiment, memory elements of an array make different delay adjustments to different active data paths based on detected different variations.

Methods and computer program products are presented for on-die signal calibration. In certain embodiments, a computer program product comprises a non-transitory computer readable storage medium storing executable program code to perform operations for on-die signal calibration. Steps of a method and/or operations of a computer program product, in one embodiment, may include one or more of the functions described above with regard to the disclosed apparatuses and systems.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
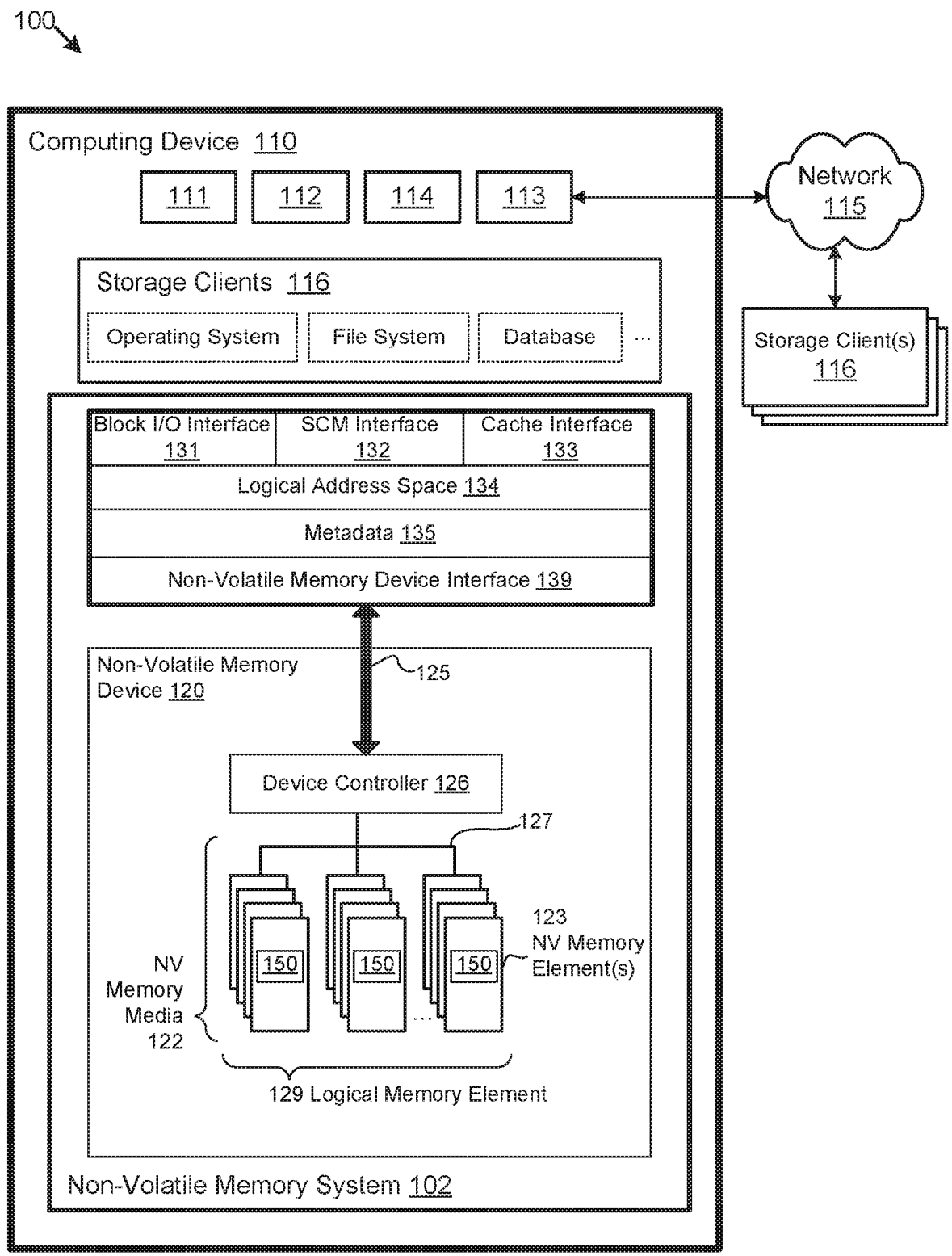
FIG. 1 is a schematic block diagram of one embodiment of a system comprising a calibration component.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 comprising one or more calibration components 150 for a memory device 120 and/or another integrated circuit device 120. A calibration component 150 may be part of a memory element 123, and may be in communication with a device controller 126, a device driver, or the like. In some embodiments, a calibration component 150 may at least partially operate on and/or in communication with a memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or device 126 to a communication network 115, such as an Internet Protocol (IP) network, a Storage Area Network (SAN), wireless network, wired network, or the like.

The memory device 120, in various embodiments, may be disposed in one or more different locations relative to the computing device 110. In one embodiment, the memory device 120 comprises one or more volatile and/or non-volatile memory elements 123, such as semiconductor chips, die, packages, or other integrated circuit devices disposed on one or more printed circuit boards, storage housings, and/or other mechanical and/or electrical support structures. For example, the memory device 120 may comprise one or more direct inline memory module (DIMM) cards, one or more expansion cards and/or daughter cards, a memory card, a universal serial bus (USB) drive, a solid-state-drive (SSD) or other hard drive device, and/or may have another memory and/or storage form factor. The memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, the calibration component 150 may include one or more computer readable instructions stored on the non-transitory storage medium 114.

The memory system 102, in the depicted embodiment, includes one or more calibration components 150. A calibration component 150, in one embodiment, is configured to provide setup time (tDS), hold time (tDH), and/or other signal calibration on-die from within a memory element 123 or other integrated circuit device 123 (e.g., in response to a single calibration command from a device controller 126, in response to receiving calibration data from a device controller 126 over a bus 127, without sending calibration data back to a device controller 126 over a bus 127, and/or the like).

Certain signals (e.g., data signals, command signals, control signals, or the like) may depend on and/or be interpreted in view of one or more other signals (e.g., a clock signal, a timing signal, or the like). Due to process and/or material variations in a memory element 123 or other integrated circuit device 123, a device controller 126, or both, there may be a timing mismatch between related signals (e.g., a data signal and a clock signal), or a mismatch may develop over time due to operating conditions, damage, age, or the like. Further, different data paths of the same integrated circuit device 123 may have different timing mismatches, due to different distances from the device controller 126, variations in materials and/or a manufacturing process, or the like. If a signal (e.g., a rising edge) arrives at an integrated circuit device 123 earlier than an associated clock signal, setup time (e.g., an amount of time before a clock signal edge) may be adequate, but there may be insufficient hold time (e.g., an amount of time after a clock signal edge), as described below, causing a hold time error, or the like. If a signal arrives at an integrated circuit device 123 later than an associated clock signal, a hold time may be adequate but there may be insufficient setup time, causing a setup time error, or the like.

Calibration, as used herein, may comprise the adjustment and/or synchronization of two or more signals. For example, calibrating the timing of a data signal and a clock signal (e.g., adjusting a delay, increasing a delay, decreasing a delay, or the like), in certain embodiments, may reduce or eliminate transmission errors (e.g., setup time errors, hold time errors, or the like) in the data signal due to timing. In one embodiment, a calibration component 150, may calibrate one or more signals for an integrated circuit device 123 at or near a manufacture time (e.g., during die sort or another testing process by a manufacturer, vendor, distributor, or the like). In a further embodiment, a calibration component 150 may calibrate one or more signals for an integrated circuit device 123 periodically, in response to one or more triggers (e.g., in response to a calibration command from a device controller 126, a startup or power-on process for the integrated circuit device 123 and/or for a memory device 120, detecting a timing or other data error on the integrated circuit device 123, a background calibration process, or the like).

In this manner, a calibration component 150, in certain embodiments, may perform signal calibration from within a die 123 faster than a device controller 126 could perform the calibration for the die 123 externally (e.g., by eliminating the transmission of calibration data back to the device controller 150 on the bus 127, by allowing multiple die 123 to calibrate themselves in parallel and/or simultaneously, or the like). For example, in certain embodiments, a device 120 may include multiple integrated circuit chips 123, die 123, and/or die planes 123, each of which may comprise one or more calibration components 150, to independently calibrate signals (e.g., setup times and/or hold times, or the like) separately from within the die 123. Multiple die 123 and/or die planes 123, in one embodiment, may be stacked or otherwise combined in a multi-die 123 arrangement (e.g., after manufacture), during which process, a signal calibration and/or characterization for a die 123 may change from when it was initially manufactured. Further, in some embodiments, a signal calibration and/or characterization for a die 123 may change over time, in the field, due to wear and/or damage of the die 123 through use, or the like. A calibration component 150, in certain embodiments, may dynamically update, recharacterize, and/or recalibrate signal timing (e.g., a setup time and/or hold time) for a die 123 over time (e.g., after combining multiple die 123 at or near manufacture time, in the field during runtime, or the like).

A calibration component 150, in various embodiments, may calibrate a signal (e.g., a setup time and/or a hold time) by introducing and/or removing delay in a data path of an integrated circuit device 123 (e.g., detecting and/or compensating for setup failures and/or hold failures). A setup time, as used herein, comprises an amount of time before a clock signal's edge that a data signal is stable in order to be latched or otherwise received. A hold time, as used herein, comprises an amount of time after a clock signal's edge that a data signal is stable in order to be latched or otherwise received.

In one embodiment, a device controller 126 may send a calibration command and/or calibration data to one or more memory elements 123 and/or other integrated circuit devices, in response to which an on-die calibration component 150 may perform one or more calibration operations. For example, in certain embodiments, the calibration component 150 may receive calibration data (e.g., a predefined data pattern) from an active data path of a memory element 123 or other integrated circuit device, detect one or more variations in the received data, and either increase or decrease a delay of the active data path based on the detected one or more variations. A variation, as used herein, may comprise a difference. For example, a variation in data may include different data values, a data error, a timing skew (e.g., a setup time error, a hold time error, or the like), a difference in received data from originally sent data, a difference in received data from a predefined calibration data pattern, or the like.

An active data path of an integrated circuit device 123, as used herein, may comprise an electrical and/or communications route that workload data (e.g., data from a device controller 126, user data, client data, data from a storage client 116, or the like) travels within the integrated circuit device 123 (e.g., extending between an input/output electrical contact of the integrated circuit device 123 and a data buffer for a memory medium, between an input/output electrical contact of the integrated circuit device 123 and the memory medium, or the like). An active data path may comprise the actual path to be calibrated, allowing the calibration component 150, in certain embodiments, to accurately calibrate the actual active data path based on its actual skew, rather than on a replica data path, on another location or circuit, or the like. In a further embodiment, the calibration component 150 may independently calibrate multiple different active data paths on the same integrated circuit device 123, each based on the actual skew or other variation of the different active data paths.

In other embodiments, instead of receiving a calibration data pattern from a device controller 126, a calibration component 150 may generate a predetermined and/or fixed calibration data pattern from within an integrated circuit device 123, which the calibration component 150 may send and/or transmit on at least a portion of an internal active data path of the integrated circuit device 123 for signal calibration.

The calibration component 150, in one embodiment, receives the calibration data pattern or a varied version thereof (e.g., due to signal timing errors) from an end of the active data path of the integrated circuit device 123 (e.g., taps, copies, monitors, reads, and/or otherwise receives the data from a data buffer at an end of the active data path or the like) and may determine whether there's been a setup or hold failure based on the received data. Tapping data from an active data path, as used herein, may comprise receiving and/or rerouting the data directly from the active data path (e.g., rather than using a replica data path, a different data path, a predefined delay setting, or the like). For example, the calibration component 150 may tap (e.g., monitor, copy, read, reroute, divert, and/or otherwise access) data, such as a received calibration data pattern or other calibration data, from an end and/or an output of an active data path (e.g., a data buffer or the like at an end of the active data path). The calibration component 150, in one embodiment, may have a separate data connection for tapping and/or otherwise monitoring calibration data from an active data path (e.g., from a data buffer at an end of an active data path, or the like), without interfering with a data connection between the active data path (e.g., a data buffer of an active data path) and a memory medium (e.g., an array of memory cells, or the like). For example, a data connection between an active data path and the calibration component 150 may be selective, and may be connected and/or activated in response to a calibration command from a device controller 126, in response to a calibration operation, or the like. A data buffer, as used herein, comprises volatile or non-volatile data storage. For example, a data buffer may comprise data latches, registers, flip-flops, RAM, a page buffer, a cache or scratchpad area of a non-volatile memory medium 123, or the like.

The calibration pattern may be selected such that a first variation in the received data indicates a setup failure (e.g., a variation such as a binary zero at a predefined time, bit position, clock edge, or the like and an accompanying pulse signal and/or clock pulse on another predefined line) and a second variation indicates a hold failure (e.g., a variation such as a binary one at a predefined time, bit position, clock edge, or the like), while a third variation (e.g., the original calibration data, a binary zero at a predefined time and/or bit position without an accompanying pulse signal and/or clock pulse on another predefined line, or the like) may indicate no failure (e.g., correct and/or calibrated timing). For example, in one embodiment, a calibration component 150 may send a pattern of "0 1 0 0 0 0 0 0" or the like on each clock edge (e.g., double data rate (DDR) to calibrate both a setup time and a hold time) on an active data path of an integrated circuit device 123.

In response to a hold failure, in certain embodiments, the calibration component 150 may increase a delay for signals on the active data path, reduce a delay for a clock signal, or the like. In response to a setup failure, in certain embodiments, the calibration component 150 may decrease a delay for signals on the active data path, increase a delay for a clock signal, or the like. A delay, as used herein, may comprise an amount of time for data (e.g., a data signal) to travel between two points. For example, a delay of an active data path may comprise an amount of time that it takes for data, a signal, or the like to travel from one end of the active data path (e.g., an input/output electrical contact, or the like) to another end (e.g., a data buffer, or the like). The calibration component 150, in various embodiments, may adjust a delay (e.g., increasing a delay, decreasing a delay) by introducing or removing delay from an active data path. For example, the calibration component 150 may adjust a delay for an internal active data path of an integrated circuit device 123 using a counter, such as a digital-to-analog converter (DAC) or the like configured as a counter, by increasing a count of the counter to increase the delay, decreasing the count of the counter to decrease the delay, or vice versa. The counter of the calibration component 150 may provide a current count (e.g., representing a delay) to a repeater, buffer, and/or another programmable and/or adjustable delay component in the active data path of the integrated circuit device 123 to provide the determined delay.

In certain embodiments, the calibration component 150 may increase a delay of an active data path by adding one or more delay components to the active data path (e.g., adding a first, second, and/or Nth delay; activating one or more transistors or other switches to route an active data path through one or more delay components; or the like). The calibration component 150, in a further embodiment, may decrease a delay of an active data path by removing one or more delay components from the active data path (e.g., removing a first, second, and/or Nth delay; activating one or more transistors or other switches to remove one or more delay components from the active data path; or the like). Whether the calibration component 150 adds and/or removes discrete delay components to or from an active data path or adjusts a delay using a single, programmable, and/or adjustable delay component, increasing a delay may cause a data signal to take longer to travel through the active data path than before the increased and decreasing a delay may cause a data signal to travel faster through the active data path than before the decrease.

In certain embodiments, a calibration component 150 for an integrated circuit device 123 may store a delay setting (e.g., a current delay count for a DAC and/or another counter) across a power down and/or restart event for the device 120, to continue to provide the delay without recalibration. In a further embodiment, a calibration component 150 for an integrated circuit device 123 may recalibrate and/or recharacterize a signal (e.g., determining a new delay count for a DAC and/or another counter) after each power down and/or restart event for the device 120 (e.g., during a power up procedure or the like).

In one embodiment, a calibration component 150 comprises a clock divider circuit (e.g., which may be common to multiple I/O channels, dies, die planes, or the like); one or more flip-flops, latches, registers, or other storage; a counter such as an up/down counter, DAC, or the like (e.g., for each of multiple I/O channels, dies, die planes, or the like); or the like. A calibration component 150, in certain embodiments, may perform a calibration comprising a four cycle DDR protocol, sending the calibration data pattern on both edges with respect to a clock signal (e.g., such as the fixed data pattern of 0 1 0 0 0 0 0 0 described above).

In one embodiment, a calibration component 150 may comprise logic hardware of a memory element 123, other programmable logic, firmware for a for a memory element 123, microcode for execution by a memory element 123, or the like. In another embodiment, a calibration component 150 may comprise executable software code, stored on a computer readable storage medium for execution by logic hardware of a memory element 123. In a further embodiment, a calibration component 150 may include a combination of both executable software code and logic hardware.

In one embodiment, the calibration component 150 is configured to receive storage requests from a device driver or other executable application via buses 125, 127, a device controller 126, or the like. The calibration component 150 may be further configured to transfer data to/from a device driver and/or storage clients 116 via the bus 125. Accordingly, the calibration component 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the calibration component 150 may receive storage requests as an API call from a storage client 116, as an IO-CTL command, or the like. The calibration component 150 is described in further detail below with regard to FIG. 3.

According to various embodiments, a device controller 126 may manage one or more memory devices 120 and/or memory elements 123. The memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a memory device 120). Memory units may include, but are not limited to: pages, memory divisions, blocks, sectors, collections or sets of physical storage locations (e.g., logical pages, logical blocks), or the like.

A device driver and/or the device controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the memory device 120 may maintain metadata 135, such as a logical to physical address mapping structure, to map logical addresses of the logical address space 134 to media storage locations on the memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more memory devices 120. The one or more memory devices 120 may include different types of memory devices including, but not limited to: volatile memory devices, solid-state storage devices, semiconductor storage devices, SAN storage resources, or the like. The one or more memory devices 120 may comprise one or more respective device controllers 126 and memory media 122. A device driver may provide access to the one or more memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the memory device 120. Also, in some embodiments, the SCM interface 132 presented to the storage clients 116 provides access to data transformations implemented by the one or more memory devices 120 and/or the one or more device controllers 126.

A device driver may present a logical address space 134 to the storage clients 116 through one or more interfaces. As discussed above, the logical address space 134 may comprise a plurality of logical addresses, each corresponding to respective media locations the on one or more memory devices 120. A device driver may maintain metadata 135 comprising any-to-any mappings between logical addresses and media locations, or the like.

A device driver may further comprise and/or be in communication with a memory device interface 139 configured to transfer data, commands, and/or queries to the one or more memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The memory device interface 139 may communicate with the one or more memory devices 120 using input-output control (IO-CTL) command(s), IO-CTL command extension(s), remote direct memory access, or the like.

The communication interface 113 may comprise one or more network interfaces configured to communicatively couple the computing device 110 and/or the device controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The device controller 126 is part of and/or in communication with one or more memory devices 120. Although FIG. 1 depicts a single memory device 120, the disclosure is not limited in this regard and could be adapted to incorporate any number of memory devices 120.

The memory device 120 may comprise one or more elements 123 of volatile and/or non-volatile memory media 122, which may include but is not limited to: volatile memory such as SRAM and/or DRAM; non-volatile memory such as ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), and/or optical storage media; or other memory and/or storage media. The one or more elements 123 of memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the memory media 122 is referred to herein as "memory media," in various embodiments, the memory media 122 may more generally comprise one or more volatile and/or non-volatile recording media capable of recording data, which may be referred to as a memory medium, a storage medium, or the like. Further, the memory device 120, in various embodiments, may comprise a recording device, a memory device, a storage device, or the like. Similarly, a memory element 123, in various embodiments, may comprise a recording element, a memory element, a storage element, or the like. In other embodiments, a memory element 123 may comprise a different type of integrated circuit device (e.g., an ASIC, a CPU, a communications device, a graphics device, a system on a chip, a programmable logic device, or the like), and memory elements 123 are used only by way of example as one type of integrated circuit device (e.g., integrated circuit die, chip, die plane, package, or the like) for which the calibration component 150 may calibrate one or more signals, and other types of integrated circuit devices are contemplated within the scope of this disclosure.

The memory media 122 may comprise one or more memory elements 123, which may include, but are not limited to: chips, packages, planes, die, or the like. A device controller 126 may be configured to manage data operations on the memory media 122, and may comprise one or more processors, programmable processors (e.g., FPGAs), ASICs, micro-controllers, or the like. In some embodiments, the device controller 126 is configured to store data on and/or read data from the memory media 122, to transfer data to/from the memory device 120, and so on.

The device controller 126 may be communicatively coupled to the memory media 122 by way of a bus 127. The bus 127 may comprise an I/O bus for communicating data to/from the memory elements 123. The bus 127 may further comprise a control bus for communicating addressing and other command and control information to the memory elements 123. In some embodiments, the bus 127 may communicatively couple the memory elements 123 to the device controller 126 in parallel. This parallel access may allow the memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the memory elements 123.

The device controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the memory system 102. A device driver may further comprise a memory device interface 139 that is configured to transfer data, commands, and/or queries to the device controller 126 over a bus 125, as described above.

Figure 2:
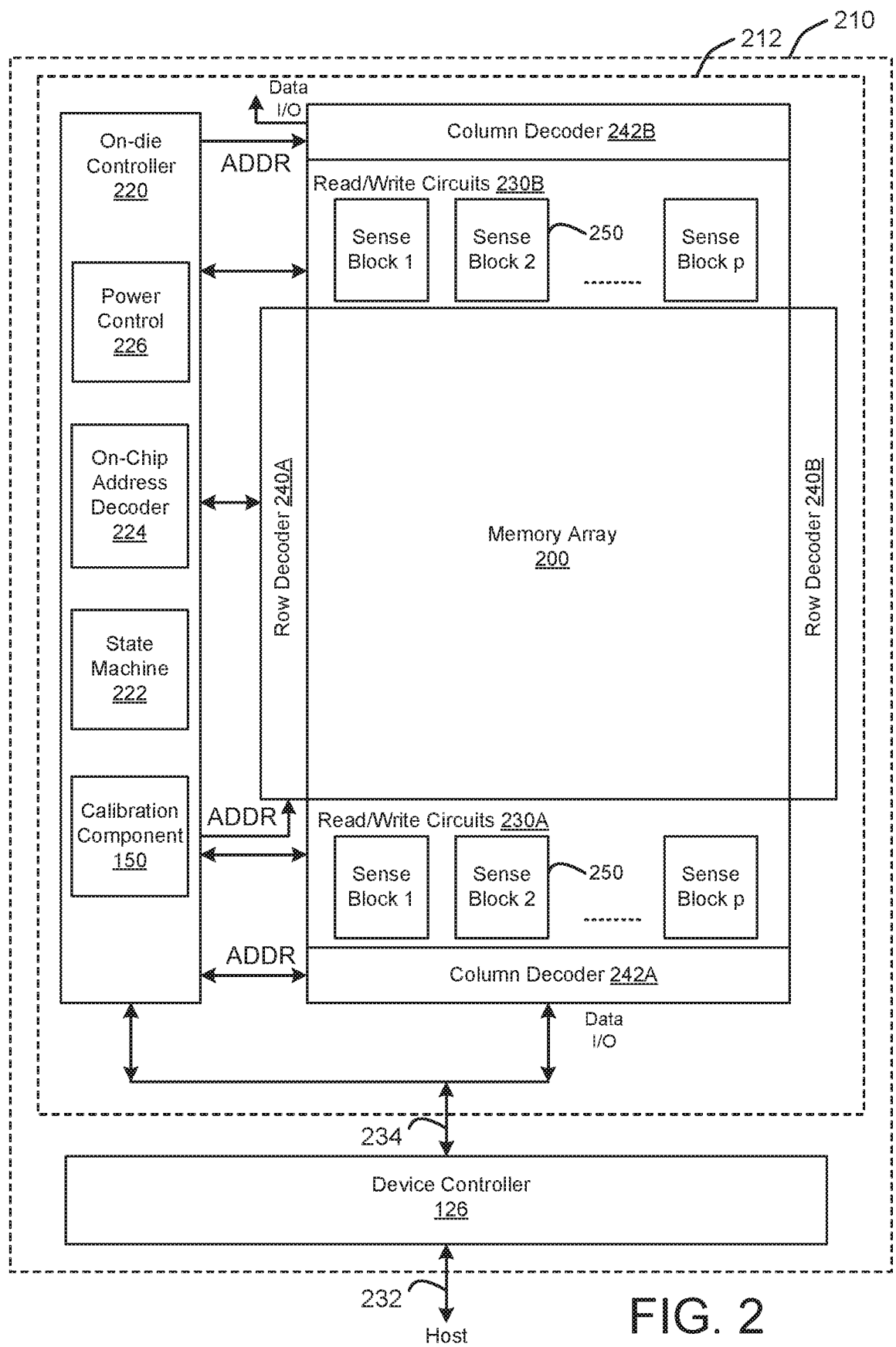
FIG. 2 is a schematic block diagram illustrating another embodiment of a system comprising a calibration component.

FIG. 2 depicts one embodiment of a storage device 210 that may include one or more memory die or chips 212, and/or another type of integrated circuit device 212. The storage device 210 may be substantially similar to the memory device 120 described with reference to FIG. 1. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a device controller 126 is included in the same memory device 210 (e.g., a removable storage card or package) as the one or more memory die 212. Commands and data are transferred between the host and the device controller 126 via lines 232 and between the device controller 126 and the one or more memory die 212 via lines 234. One implementation can include multiple chips 212, a chip 212 may include multiple die 212 and/or die planes 212, or the like.

The die controller 220, in one embodiment, cooperates with the read/write circuits 230A/230B to perform memory operations on the memory array 200. The die controller 220, in certain embodiments, includes a calibration component 150, a state machine 222, an on-die address decoder 224, and a power control circuit 226. The calibration component 150, in one embodiment, is configured to receive one or more calibration commands and/or calibration data from the device controller 126 over the bus 234 and an active path of the die/chip 212 (e.g., from an input/output contact or pad on an outer surface of the die/chip 212, through various communications circuitry to a data buffer and/or latches for the memory array 200, or the like). The calibration component 150 may detect and/or determine one or more variations in the received calibration data, and use the variations to adjust a setup and/or a hold time of the active data path of the die/chip 212. One embodiment of a plurality of active data paths 402a-n for a single die/chip 212 or other integrated circuit device is described below with regard to FIG. 4.

The state machine 222, in one embodiment, provides chip-level control of memory operations. The on-die address decoder 224 provides an address interface to convert between the address that is used by the host or a memory controller to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that can create voltages larger than the supply voltage.

In certain embodiments, the state machine 222 includes an embodiment of the calibration component 150. The calibration component 150, in certain embodiments, may include software, firmware, and/or hardware in a die controller 220 and/or a state machine 222.

In one embodiment, one or any combination of die controller 220, calibration component 150, power control circuit 226, decoder circuit 224, state machine circuit 222, decoder circuit 242A, decoder circuit 242B, decoder circuit 240A, decoder circuit 240B, read/write circuits 230A, read/write circuits 230B, and/or controller 126 can be referred to as one or more managing circuits.

Figure 3:
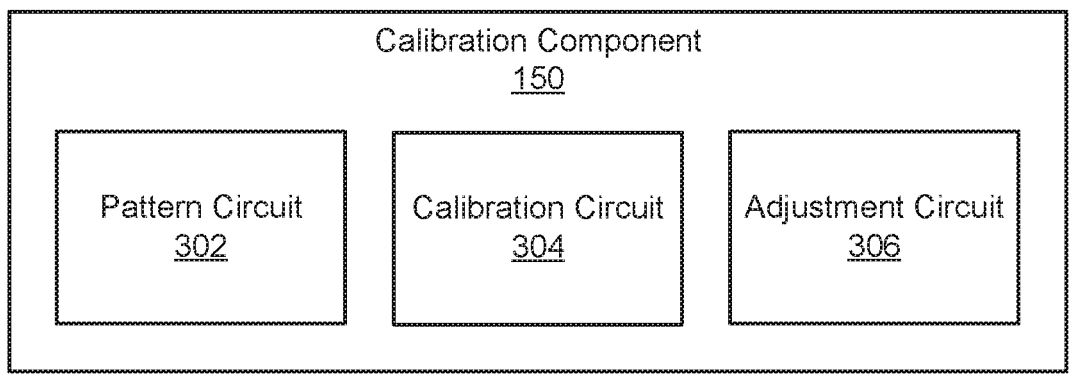
FIG. 3 is a schematic block diagram illustrating one embodiment of a calibration component.

FIG. 3 depicts one embodiment of a calibration component 150. The calibration component 150 may be substantially similar to the calibration component 150 described above with regard to FIG. 1 and FIG. 2. In general, as described above, the calibration component 150 is configured to provide on-die signal calibration for one or more integrated circuit die 123 and/or another type of integrated circuit device 123. In the depicted embodiment, the calibration component 150 includes a pattern circuit 302, a calibration circuit 304, and an adjustment circuit 306, which may be part of an on-die controller or other on-die circuitry.

In one embodiment, the pattern circuit 302 may receive a calibration data pattern as a parameter of and/or in response to a calibration command (e.g., from a device controller 126 or the like). In a further embodiment, the pattern circuit 302 generates a calibration data pattern for one or more integrated circuit devices 123 (e.g., the pattern circuit 302 being disposed on a device controller 126, the patter circuit 302 being disposed within an integrated circuit device 123, or the like). The pattern circuit 302 may send and/or transmit the calibration data pattern on a data path of the integrated circuit device 123 (e.g., from an input/output pad or other contact to a flip-flop, latch, or other data buffer, or the like).

The pattern circuit 302, in certain embodiments, may generate a calibration data pattern in response to receiving a calibration command from a device controller 126 for the integrated circuit device 123. As described above, in certain embodiments, a device controller 126 may send calibration commands and/or calibration data to a plurality of different integrated circuit devices 123 in parallel, each of which may comprise an independent calibration component 150, or the like for on-die signal calibration substantially simultaneously, in parallel. In a further embodiment, the pattern circuit 302 may generate a calibration data pattern in response to a startup operation for the integrated circuit die 123 and/or the device 120.

A device controller 126, in one embodiment, may send calibration data to a plurality of different active data paths (e.g., to different input/output pads or other contacts) of one or more integrated circuit devices 123, to calibrate the different active data paths in parallel. In one embodiment, a single calibration component 150 calibrates multiple active data paths of an integrated circuit device 123. In other embodiments, each active data path of an integrated circuit device 123 comprises its own calibration component 150 and/or portion of a calibration component 150, or the like.

In one embodiment, the calibration circuit 304 receives the calibration data (e.g., on the integrated circuit device 123, from the pattern circuit 302, at an end of an active data path of the integrated circuit device 123, or the like) and determines whether there is a variation in the received calibration data from the originally sent and/or received calibration data pattern (e.g., from a predefined, expected, and/or known calibration data pattern). For example, the calibration circuit 304 may receive the data at an opposite end of an active data path from the pattern circuit 302 and/or the device controller 126, from a flip-flop or other data latch at an end of the active data path, or the like.

The calibration circuit 304, in certain embodiments, may detect a first variation in received data (e.g., a binary zero at a predefined location in the received data and a pulse signal and/or clock pulse on another line), a second variation (e.g., a binary one at a predefined location in the received data), and/or other predefined variations indicating a data signal error such as a hold time error, a setup time error, or the like. For example, in one embodiment, the calibration circuit 304 detects a first variation in the received calibration data by detecting a binary zero on a predefined clock edge (e.g., an initial or first rising clock edge of the received data) and a binary one on a different clock edge (e.g., a next rising clock edge of the received data after the initial/first rising clock edge) indicating a setup failure, when a binary zero on both the predefined clock edge and the different clock edge (e.g., with a binary one on the falling clock edge in between the two) would indicate no failure, or the like, and the adjustment circuit 306 may reduce a delay of the active data path and/or increase a delay in a clock path to reduce and/or eliminate the setup failure.

In a further embodiment, the calibration circuit 304 detects a second variation in the received calibration data by detecting a binary one on the predefined clock edge (e.g., an initial or first rising clock edge of the received data) indicating a hold failure, when a binary zero on both the predefined clock edge and the different clock edge (e.g., with a binary one on the falling clock edge in between the two) would indicate no failure, or the like, and the adjustment circuit 306 may increase a delay of the active data path and/or decrease a delay in a clock path to reduce and/or eliminate the hold failure. In this manner, in certain embodiments, the calibration circuit 304 may detect a timing error based on whether a predetermined binary value (e.g., a binary one or a binary zero) is received earlier or later than expected (e.g., earlier or later than required to form a predefined calibration data pattern). The pattern circuit 302 may repeat the calibration pattern multiple times (e.g., two times, three times, four times, five times, six times, seven times, eight times, until a full page of repeated calibration data patterns have been sent, or more) to allow the calibration circuit 304 to detect variations in the received data multiple times and the adjustment circuit 306 to iteratively and/or repeatedly make multiple adjustments to the timing of an active data path, to iteratively reduce and eliminate one or more setup and/or hold failures in the active data path.

One embodiment of a calibration circuit 304 may comprise the clock divider 502, the one or more flip-flops 504*a-n*, and/or the one or more up/down counters 506*a-n* described below with regard to FIG. 5. In other embodiments, the adjustment circuit 306 may comprise the one or more up/down counters 506*a-n*, as described below. Because, in certain embodiments, a certain predefined binary value (e.g., a binary zero or a binary one) on a predefined clock edge may indicate either a timing error (e.g., either a setup or a hold error) or no error (e.g., a binary one on an initial/first rising edge may indicate a hold failure and a binary zero on the initial/first rising edge may indicate either a setup failure or no failure, or vice versa), the calibration circuit 304, in certain embodiments, may generate and/or receive a pulse signal and/or clock pulse in response to an opposite binary value on a next/second rising clock edge (e.g., a binary one on a next rising clock edge after a binary zero on an initial rising clock edge, or vice versa for a different calibration data pattern). For example, in one embodiment, a binary zero on the initial/first rising edge of a received calibration data pattern and a pulse signal and/or clock pulse on another line (e.g., a DATA_FF line) may indicate a setup failure, to differentiate the setup failure from a normal or no failure condition (e.g., for a calibration data pattern of "01000000" or the like). In other embodiments, a binary one on an initial/first rising edge of a received calibration data pattern and a pulse signal and/or clock pulse on another line (e.g., a DATA_FF line) may indicate a hold failure, for a different calibration data pattern, or the like.

The calibration circuit 304, in certain embodiments, may indicate to the adjustment circuit 306 whether a setup failure, a hold failure, or no failure was detected. For example, the calibration circuit 304 may provide an identifier of the delay, such as an up/down counter value and/or signal, a pulse signal and/or clock pulse (e.g., on a DATA_FF line), or the like to the adjustment circuit 306, which the adjustment circuit 306 may use to determine whether to increment an up/down counter in one direction or the other (e.g., decreasing a count for a setup failure, increasing a count for a hold failure, or vice versa).

The adjustment circuit 306 may initialize a value for an up/down counter at or near a center point of a range for the up/down counter (e.g., 3 or 4 for a 3 bit 0-7 up/down counter, 1 or 2 for a 2 bit 0-3 up/down counter, 7 or 8 for a 3 bit 0-15 up/down counter, or the like). The pattern circuit 302 may repeat a calibration data pattern (e.g., repeating a calibration cycle, a calibration command, or the like) multiple times. A number of times a calibration data pattern is repeated, in certain embodiments, may be selected based on a number of bits of an up/down counter, such that the calibration circuit 304 may adjust a count value of the up/down counter from a default value to either a minimum value or a maximum value of the up/down counter during the repeated calibration data patterns (e.g., repeating 4 times for a 3 bit 0-7 up/down counter so that a count value may be adjusted from a default of 3 or 4 to either a 0 for a maximum setup failure or to a 7 for a maximum hold failure, or the like).

In one embodiment, the adjustment circuit 306 corrects and/or adjusts timing for signals on an active data path of the integrated circuit device 123 based on the data received by the calibration circuit 304. For example, as described above, in certain embodiments, the adjustment circuit 306 may receive an indicator of a setup failure, a hold failure, of an adjustment to be made, of a direction of an adjustment to be made, or the like, from the calibration circuit 304. For example, the adjustment circuit 306 may receive a pulse signal and/or clock pulse, an up/down signal, or other indicator from the calibration circuit 304 which the adjustment circuit 306 may use to increment an up/down counter indicating an amount of delay to introduce into an active data path (e.g., using a repeater, a buffer, and/or another delay element placed in the actual active data path).

The adjustment circuit 306, in certain embodiments, reduces a delay of a data path of the integrated circuit device 123 in response to the calibration circuit 304 detecting a first variation in the received data and increases the delay of the data path of the integrated circuit device 123 in response to the calibration circuit 304 detecting a second variation in the received data. For example, in response to receiving a pulse signal and/or clock pulse (e.g., on a DATA_FF line or other signal line) from the calibration circuit 304, the adjustment circuit 306 may up count an up/down counter in response to a first state of an up/down signal from the calibration circuit 304 (e.g., a binary one, a binary zero, or the like) and the adjustment circuit 306 may down count the up/down counter in response to a second state (e.g., an opposite state, a different state, or the like from the first state) of the up/down signal from the calibration circuit 304.

In one embodiment, a repeater, buffer, or other delay element of the adjustment circuit 306 in an active data path may increase a delay in response to receiving a higher count value from an up/down counter (e.g., a digital-to-analog converter configured as an up/down counter, or the like) in response to the calibration circuit 304 detecting a hold failure or the like, and decrease a delay in response to receiving a lower count value from the up/down counter in response to the calibration circuit 304 detecting a setup failure or the like. In a different embodiment, a repeater, buffer, or other delay element of the adjustment circuit 306 may decrease a delay in response to receiving a lower count value and increase the delay in response to receiving a higher count value (e.g., an opposite encoding than described above).

The adjustment circuit 306 may reduce a delay to increase a setup time for a data path and increase a delay to increase a hold time for the data path. The adjustment circuit 306, in certain embodiments, may comprise a digital-to-analog converter (DAC) configured as an up/down counter, that provides an identifier of the delay (e.g., a count value) to a repeater, buffer, and/or another delay element of the adjustment circuit 306 in an active data path, to introduce the identified delay. For example, as described above, the adjustment circuit 306 may comprise a digital-to-analog converter (DAC) configured as an up/down counter that the adjustment circuit 306 may down count to reduce a delay and up count to increase a delay. As described above, in certain embodiment each of a plurality of active data paths of an integrated circuit device 123 and/or each of a plurality of integrated circuit devices 123 may each comprise a calibration circuit 304 and/or an adjustment circuit 306, for calibrating signals and/or adjusting delay in parallel for different active data paths (e.g., each active data path comprising a repeater, buffer, and/or another delay element which is independently adjustable to provide a delay customized for the specific active data path, or the like).

In a certain embodiment, an on-die controller for a memory die 123, such as the die controller 220 of FIG. 2, may include one or more of the pattern circuit 302, the calibration circuit 304, and/or the adjustment circuit 306. As described above, in one embodiment, a device controller 126 may comprise at least a portion of the pattern circuit 302, in order to send one or more calibration commands and/or calibration data patterns to a plurality of integrated circuit die 123 in parallel, in order to calibrate one or more entire active data paths (e.g., from an input/output contact or pad to a data buffer, or the like). In certain embodiments, a die 123 may be a semiconductor device of volatile and/or non-volatile memory. In various embodiments, a die 123 may refer to an integrated circuit (e.g., a monolithic integrated circuit device) that includes both a core array of memory cells and peripheral components for communicating with the core. In one embodiment, such an integrated circuit may be a three-dimensional integrated circuit that includes multiple die planes and/or layers, but may still be referred to as a die.

As described above with regard to FIGS. 1 and 2, a memory device 120 may include one or more memory elements 123 or dies 123. In other embodiments, a die 123 may comprise a different type of integrated circuit, instead of or in addition to comprising memory (e.g., an ASIC, a CPU, a communications device, a graphics device, a system on a chip, a programmable logic device, or the like). In various embodiments, an on-die controller 220 may refer to a component on a die, control/operation logic on a die, a set of components on a die, or the like, that controls data operations for a memory array 200 on the die.

Figure 4:
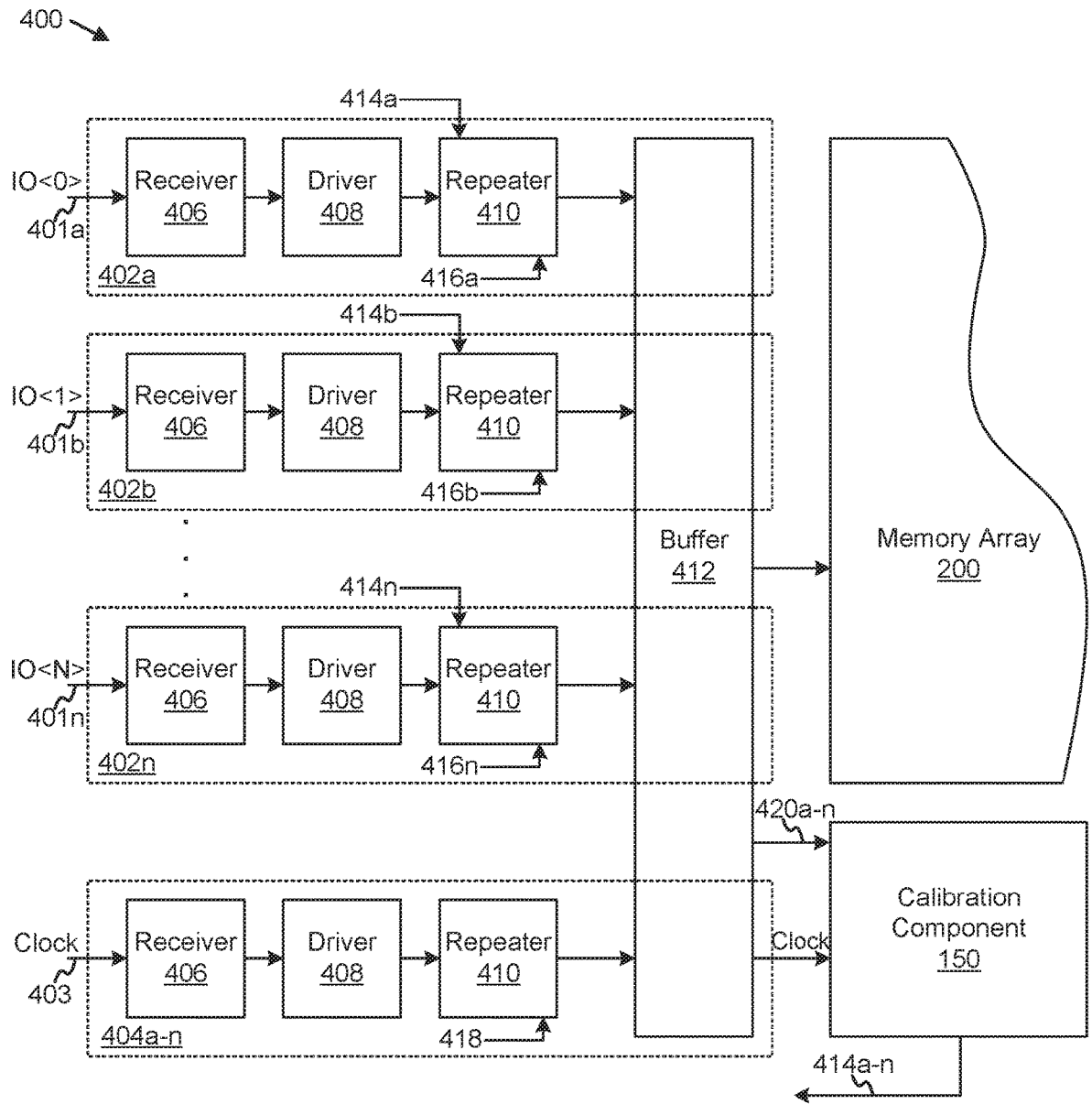
FIG. 4 is a schematic block diagram illustrating one embodiment of a system for on-die signal calibration.

FIG. 4 depicts one embodiment of a system 400 for on-die signal calibration. The system 400, in the depicted embodiment, includes a calibration component 150, a plurality of active data paths 402a-n, one or more clock paths 404a-n, a data buffer 412, and a memory array 200. In one embodiment, the calibration component 150 may be substantially similar to one or more of the calibration components 150 described above with regard to FIG. 1, FIG. 2, and/or FIG. 3.

In one embodiment, one or more pattern circuits 302 send one or more calibration commands and/or calibration data patterns to one or more input/output (IO) contacts 401a-n of the active data paths 402a-n of one or more integrated circuit devices 123. The one or more IO contacts 401a-n may comprise electrical contacts such as conductive pads, ports, lines, wires, connectors, or the like configured to send and/or receive data (e.g., receiving data from a device controller 126 and/or a host device 110 for the calibration component 150 and/or the memory array 200, sending data to a device controller 126 and/or a host device 110 from the calibration component 150 and/or the memory array 200, or the like).

In the depicted embodiment, the one or more active data paths 401a-n extend between the one or more IO contacts 401a-n and a data buffer 412 (e.g., at opposite ends of the active data paths 401a-n). As described above, a data buffer 412 may comprise volatile or non-volatile data storage, such as data latches, registers, flip-flops, RAM, a page buffer, a cache or scratchpad area of a memory array 200, or the like. The data buffer 412 may cache and/or store data to be stored in and/or that has been read from the memory array 200, including calibration data patterns and other data received by the IO contacts 401a-n of the one or more active data paths 401a-n. A delay offset, drift, mismatch, fault, variation or the like may differ for the different active data paths 402a-n, due to variations in manufacturing, materials, locations, geometries, distances, or the like of the different active data paths 402a-n.

In certain embodiments, using the same delay adjustment or calibration for each of the active data paths 401a-n may not remedy or correct the different delay errors in each of the active data paths 401a-n. For example, some active data paths 401a-n may have setup failures, others may have hold failures, some may have drifted further than others causing larger failures, or the like. By transmitting a calibration data pattern along the entire active data paths 401a-n and making adjustments based on the actual delays in the different active data paths 401a-n, the calibration component 150 may more accurately compensate for and/or correct the actual delays than if the calibration component 150 were to use a replica circuit, a simulation, or the like to estimate a delay.

In the depicted embodiment, each active data path 401a-n comprises an IO contact 401, a receiver 406, a driver 408, a repeater 410, and the data buffer 412. In other embodiments, an active data path 401 may comprise different components, additional components, or the like, such as a transmitter, a transceiver, a filter, an amplifier, or the like to transmit, receive, and/or process electrical data signals received from or to be transmitted over a wire, bus, line, or other communications channel (e.g., between an IO contact 401a-n and a device controller 126, host device 110, a storage client 116, or the like). In one embodiment, the one or more clock paths 404a-n may be substantially similar to the one or more active data paths 401a-n, but may receive a clock signal 403 instead of sending and/or receiving data.

As described above, in certain embodiments, an active data path 402 receives a calibration data pattern (e.g., in response to and/or as part of a calibration command), from a device controller 126 or the like. The received calibration data pattern may arrive on an IO contact 401, and be sent/transmitted through the active data path 402 (e.g., through a receiver 406, driver 408, repeater 410, to the data buffer 412). The repeater 410, in certain embodiments, may dynamically and/or configurably introduce a delay into an active data path 402, based on a delay identifier 414. The repeater 410 may be initialized to a default value of the delay identifier 414 (e.g., at or toward a middle of a potential delay range, so that the repeater 410 may increase or decrease the amount of delay it introduces into the active data path 402 over time). The calibration component 150 (e.g., a calibration circuit 304, an adjustment circuit 306, or the like) may provide delay identifiers 414a-n to the repeaters 410, to increase, decrease, or hold the delay (e.g., an adjustment circuit 306 of the calibration component 150 may comprise a digital-to-analog converter configured as an up/down counter that provides a delay identifier 414a-n such as a count value to the repeaters 410, to adjust and/or control the amount of delay).

In certain embodiments, one or more repeaters 410 may receive an additional delay adjustment 416a-n, 418 (e.g., in addition to the delay values 414a-n from the calibration component 150, in the case of a clock path 404a-n instead of a delay value 414, or the like), which may be based on an initial delay and/or timing calibration of the active data paths 402a-n and/or a clock path 404a-n (e.g., may be a configuration setting provided from a read only memory (ROM) or other non-volatile memory to a repeater 410, or the like). As described above, a repeater 410 may comprise a buffer, an amplifier, a filter, and/or another delay element that receives data (e.g., a signal) in an active data path 402a-n and retransmits the received data after a period of time (e.g., a delay period). In certain embodiments, a delay period of a repeater 410 is configurable and/or adjustable based on one or more received delay identifiers 414, 416, 418. A repeater 410, in one embodiment, may receive a delay identifier 414, 416, 418 of one bit count (e.g., 1 bit, 2 bits, 3 bits, 4 bits, 5 bits, 6 bits, 7 bits, or more) and may convert and/or decode the received delay identifier 414, 416, 418 to a different bit count (e.g., a higher bit count such as 8 bits, 16 bits, 32 bits, or the like) internally within the repeater 410 (e.g., based on a single delay identifier 414, 416, or 418 to control the delay steps; to combine multiple delay identifiers 414, 416, and/or 418; or the like).

In the depicted embodiment, the calibration component 150 reads, taps, monitors, and/or otherwise receives calibration data 420a-n from the data buffer 412 (e.g., from an end of the one or more active data paths 402a-n), and receives one or more clock signals 403 (e.g., from one or more clock paths 404a-n). The calibration data 420a-n, in one embodiment, may comprise the actual calibration data pattern(s) (e.g., with any data errors or other variations caused by delay failures in the active data paths 402a-n), which the calibration component 150 may process to detect variations in the calibration data 420a-n from the originally sent and/or expected calibration data pattern from the pattern circuit 302, or the like.

In another embodiment, the data buffer 412 may comprise at least a portion of the calibration component 150 (e.g., at least a portion of the calibration circuit 304 or the like), and the calibration data 420a-n may comprise a pulse signal and/or clock pulse, an up/down signal, and/or other information the calibration component 150 may use to determine the one or more delay identifiers 414a-n (e.g., instead of sending the data itself). For example, the data buffer 412 may comprise logic of the calibration circuit 304 to detect a predefined binary value or signal at a predefined clock edge, indicating a variation in the received calibration data pattern, and to generate the calibration data 420a-n (e.g., a data pulse and/or an up/down signal, or the like) and send it to a different portion of the calibration component 150 (e.g., the adjustment circuit 306, the one or more repeaters 410, or the like).

While the one or more active data paths 402a-n may send data to the memory array 200 from the data buffer 412 for a write/program operation and/or load data from the memory array 200 into the data buffer 412 for a read operation, for a calibration operation in response to a calibration command, the one or more active data paths 402a-n may discard, delete, overwrite, and/or disregard calibration data in the data buffer 412 (e.g., without sending the calibration data to the memory array 200) once the calibration component 150 has processed the calibration data 420a-n from the data buffer 412 to determine one or more delay identifiers 414a-n, or the like.

Figure 5:
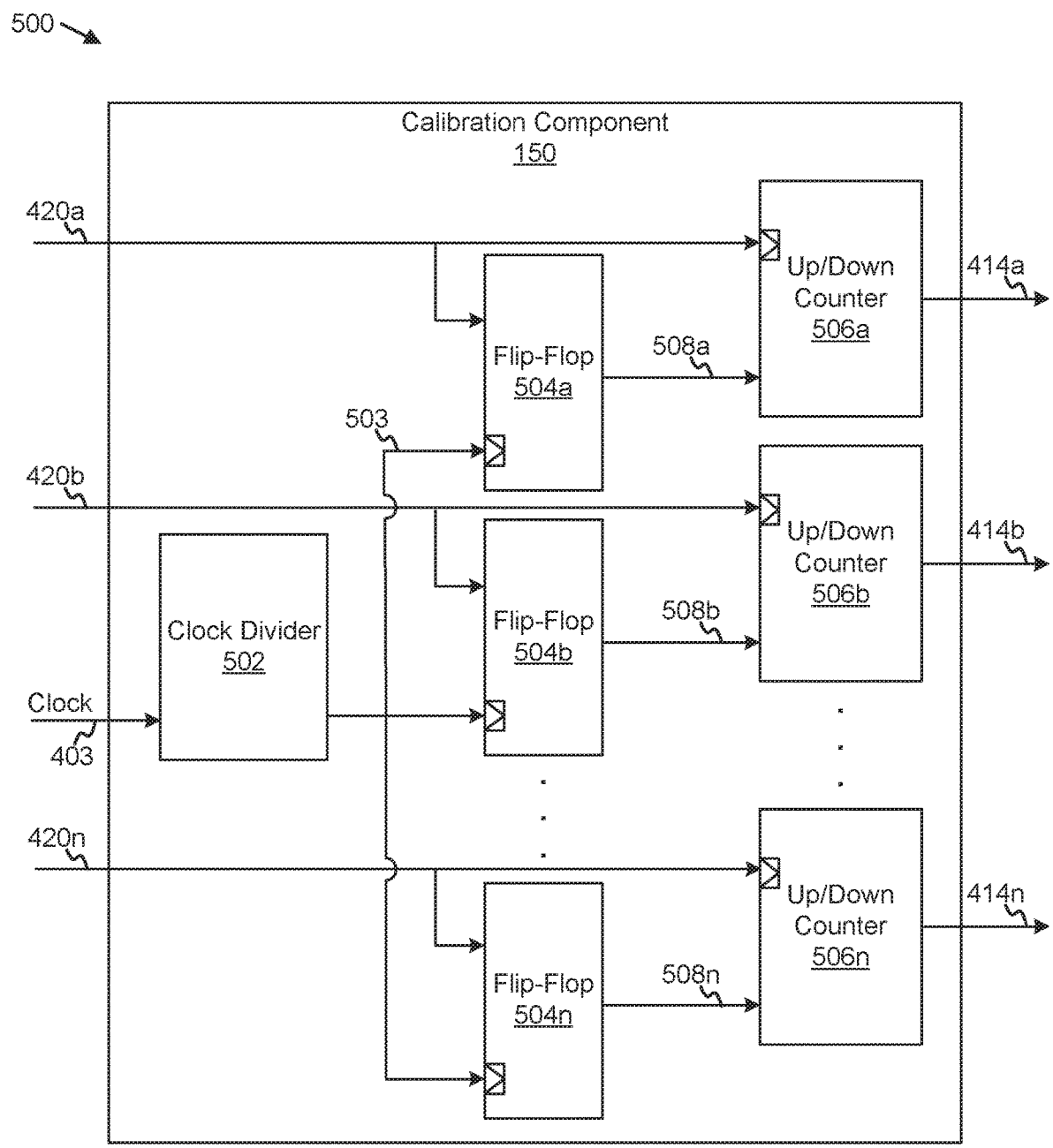
FIG. 5 is a schematic block diagram illustrating a further embodiment of a system for on-die signal calibration.

FIG. 5 depicts one embodiment of a system 500 for on-die signal calibration. The system 500, in the depicted embodiment, includes a calibration component 150. In certain embodiments, the calibration component 150 may be substantially similar to one or more of the calibration components 150 described above with regard to FIG. 1, FIG. 2, FIG. 3, and/or FIG. 4. The calibration component 150, in one embodiment, comprises an example embodiment of an adjustment circuit 306. In the depicted embodiment, the calibration component 150 comprises a clock divider 502, a plurality of flip-flops 504a-n, and a plurality of up/down counters 506a-n.

In one embodiment, a clock divider 502 of the calibration component 150 receives one or more clock signals 403 (e.g., from a clock path 403a-n, from a data buffer 412, from a device controller 126, or the like). The clock divider 502 may divide and/or adjust a number of clock cycles (e.g., a frequency) of the received one or more clock signals 403 to provide a divided clock signal 503. The divided clock signal 503 may comprise one clock cycle (e.g., one rising edge, one falling edge, or the like) per calibration data pattern, per calibration operation, or the like. For example, the clock divider 502 may comprise a three to one divider and/or generator, which may provide one clock cycle for every four received clock cycles (e.g., a high time of three clock cycles and a low time of one clock cycle, or the like) for an eight bit double data rate (DDR) calibration data pattern.

In certain embodiments, the divided clock signal 503 acts as a clock to latch the calibration data 420a-n (e.g., a pulse signal and/or clock pulse) into the flip-flops 504a-n (e.g., on a first/initial rising clock edge of the divided clock signal 503 or the like), so that the flip-flops 504a-n output an up/down signal 508a-n (e.g., with an up/down counter 506 indicating an up count to an up/down counter 506 in response to a binary one on a first/initial rising edge of the clock signal 403 and/or 503, indicating a hold failure or the like) indicating to the up/down counters 506a-n whether to up count or down count associated count values 414a-n in response to a pulse signal and/or clock pulse on the calibration data line 420a-n (e.g., which may act as a clock signal for the up/down counters 506a-n, or the like). The up/down counters 506a-n (e.g., DACs configured as up/down counters 506a-n, or the like) may provide the count values 414a-n to the repeaters 410 in the active data paths 402a-n, or the like.

Figure 6A:
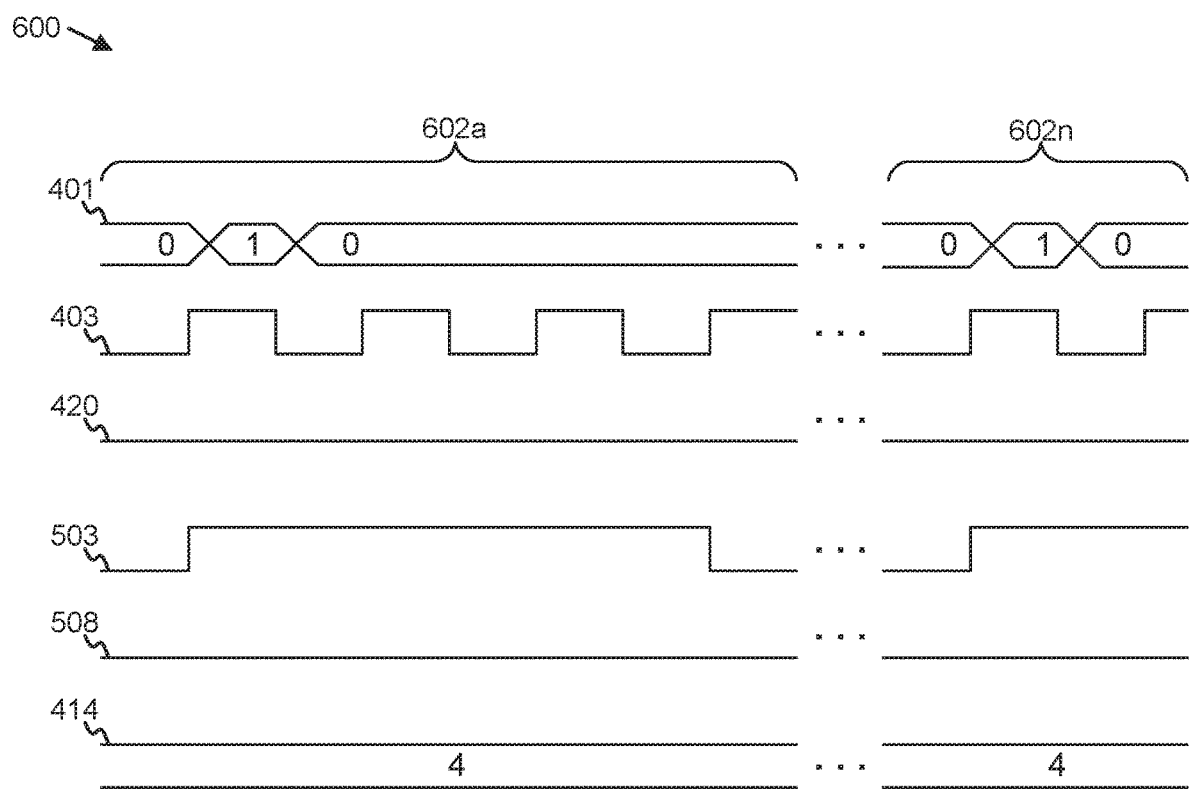
FIG. 6A is a schematic block diagram illustrating one embodiment of a calibration operation.

FIG. 6A depicts one embodiment of a calibration operation 600. The calibration operation 600 includes a plurality of repeated calibration cycles 602a-n, during each of which an active data path 402 receives a calibration data pattern 401 and a clock signal 403, which a clock divider 502 divides so that a divided clock signal 503 has a single rising edge per calibration cycle 602 (e.g., aligning with the first/initial rising edge of the clock signal 403, or the like). In the depicted embodiment, the active data path 402 has little or no timing errors or failures (e.g., no setup or hold time failures), so the calibration circuit 304 does not generate a pulse signal and/or clock pulse on a calibration data line 420, or toggle an up/down signal 508 so the adjustment circuit 306 does not change a count value 414 from the default value (e.g., "4" in the depicted embodiment).

Figure 6B:
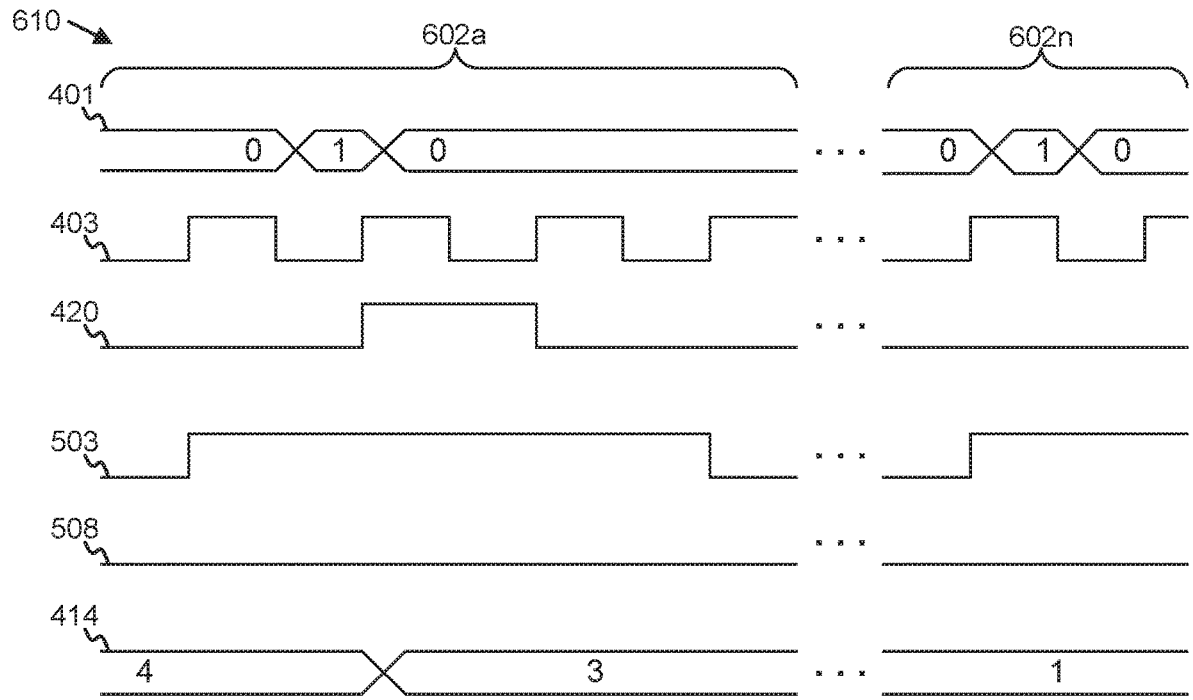
FIG. 6B is a schematic block diagram illustrating a further embodiment of a calibration operation.

FIG. 6B depicts one embodiment of a calibration operation 610 with a setup failure. In the depicted embodiment, due to a setup failure (e.g., not enough setup time, too much hold time, or the like), instead of receiving the predefined calibration pattern of "01000000," the calibration circuit 304 receives "00100000" because the initial binary zero extends to both the first/initial rising edge of the clock signal 403 and the first/initial falling edge, with the entire calibration data pattern 401 being skewed to the right by half of a clock cycle.

In response to detecting a binary one on the data line 401 on the next (e.g., second) rising clock edge of the clock signal 403, the calibration circuit 304 generates a pulse signal and/or clock pulse on the calibration data line 420 (e.g., DATA_FF), without toggling the up/down signal 508 (e.g., leaving the up/down signal 508 low to signal a setup failure and to trigger a down count) and the adjustment circuit 306 increments the count value 414 by down counting from the default value (e.g., down counting from "4" in the depicted embodiment to "3"). In the depicted embodiment, in response to 2 or more repeated setup failures during repeated calibration cycles 802a-n, the adjustment circuit 306 down counts the count value 414 to a value of "1" and there is no setup or hold failure during the final calibration cycle 602n due to the repeater 410 decreasing a delay of the active data path 402 based on the reduced count value 414.

Figure 6C:
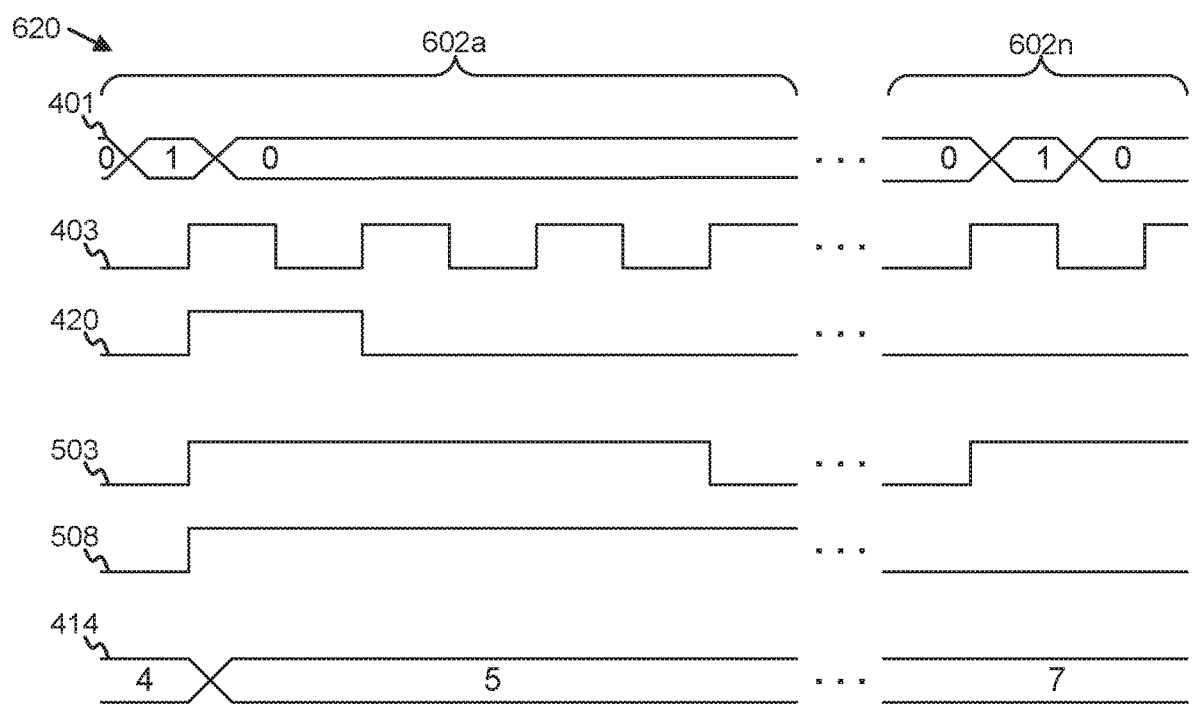
FIG. 6C is a schematic block diagram illustrating a certain embodiment of a calibration operation.

FIG. 6C depicts one embodiment of a calibration operation 610 with a hold failure. In the depicted embodiment, due to a hold failure (e.g., not enough hold time, too much setup time, or the like), instead of receiving the predefined calibration pattern of "01000000," the calibration circuit 304 receives "10000000" because the initial binary one is clocked in on the first/initial rising edge of the clock signal 403 instead of on the first/initial falling edge, with the entire calibration data pattern 401 being skewed to the left by half of a clock cycle.

In response to detecting a binary one on the data line 401 on the first/initial rising clock edge of the clock signal 403, the calibration circuit 304 generates a pulse signal and/or clock pulse on the calibration data line 420 (e.g., DATA_FF) and toggles the up/down signal 508 to a high value (e.g., to signal a hold failure and to trigger an up count) and the adjustment circuit 306 increments the count value 414 by up counting from the default value (e.g., up counting from "4" in the depicted embodiment to "5"). In the depicted embodiment, in response to 2 or more repeated hold failures during repeated calibration cycles 802a-n, the adjustment circuit 306 up counts the count value 414 to a value of "7" and there is no setup or hold failure during the final calibration cycle 602n due to the repeater 410 increasing a delay of the active data path 402 based on the increased count value 414.

Figure 7:
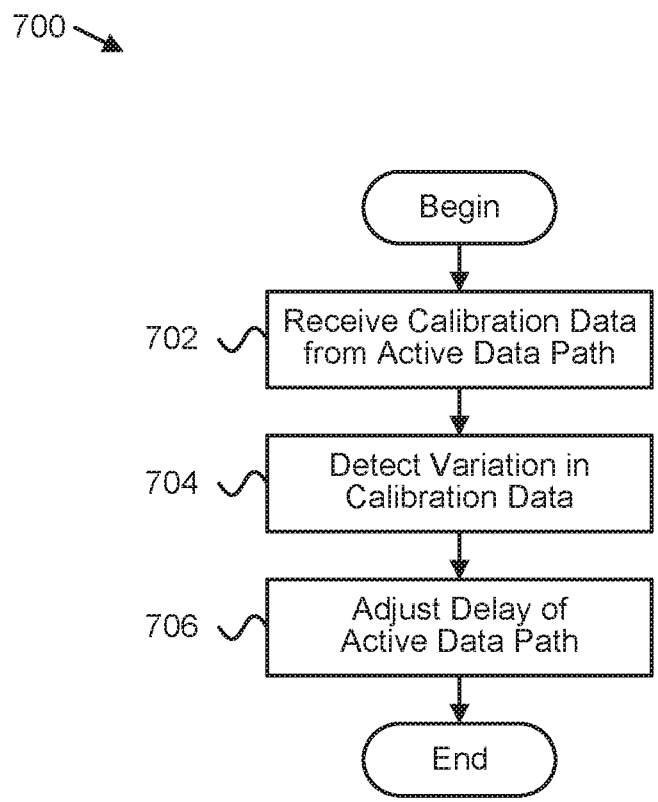
FIG. 7 is a schematic flow chart diagram illustrating one embodiment of a method for on-die signal calibration.

FIG. 7 depicts one embodiment of a method 700 for on-die signal calibration. The method 700 begins, and a calibration circuit 304 receives 702 calibration data from an active data path 402 of an integrated circuit device 123 and detects 704 a variation in the received calibration data from a predefined and/or expected calibration data pattern. An adjustment circuit 306 adjusts 706 a delay of the active data path 402 of the integrated circuit device 123 in response to detecting 704 the variation in the received calibration data and the method 700 ends.

Figure 8:
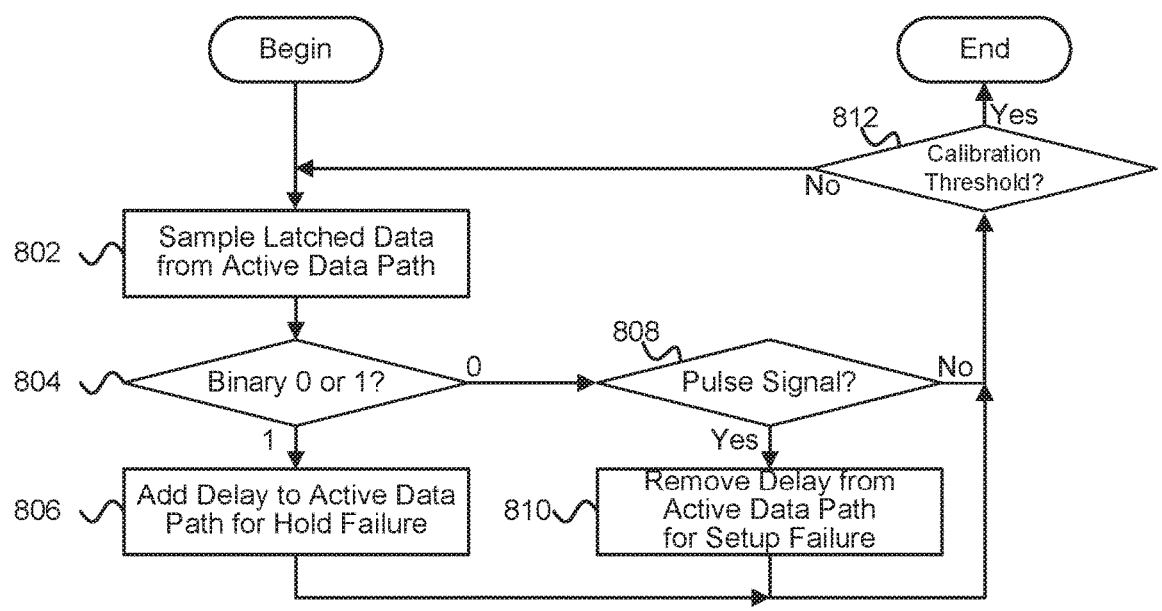
FIG. 8 is a schematic flow chart diagram illustrating a further embodiment of a method for on-die signal calibration.

FIG. 8 depicts one embodiment of a method 800 for on-die signal calibration. In the depicted embodiment, the method 800 begins and the calibration circuit 304 samples 802 the latched data from the data buffer 412 at an end of an active data path 402, to check 804 for a binary zero or a binary one at a predefined position within the latched data (e.g., a first bit, a second bit, a third bit, or the like).

If the calibration circuit 304 detects 804 a binary one (e.g., indicating a hold failure), the adjustment circuit 306 adds 806 delay to the active data path 402 by up counting or incrementing a counter value 414 and sending the counter value 414 to a repeater 410 in the active data path 402. If the calibration circuit 304 detects 804 a binary zero, the calibration circuit 304 determines 808 whether or not to generate a pulse signal 420 and/or clock pulse 420 (e.g., on DATA_FF or the like) to send to the adjustment circuit 306 (e.g., based on whether or not a binary one was received on a next/second rising edge of a clock signal 403 or the like). If the calibration circuit 304 detects 804 a binary zero and generates 808 a pulse signal 420 and/or clock pulse 420 (e.g., indicating a setup failure), the adjustment circuit 306 removes 810 a delay from the active data path 402 by down counting or decrementing the counter value 414. The method 800 repeats for multiple calibration cycles, with repeated calibration data patterns, until the pattern circuit 302 determines 812 that a calibration threshold is satisfied (e.g., 2 calibration cycles, 4 calibration cycles, 8 calibration cycles, 16 calibration cycles, or another predefined threshold) and the method 800 ends.

A means for tapping calibration data from a data buffer 412 at an end of an active data path 402 of a memory device 123 in response to a calibration command, in various embodiments, may include a calibration component 150, a calibration circuit 304, a data buffer 412, a latch, a flip flop 504, a conductive line or trace, an on-die controller 220, a die state machine 222, other logic hardware, and/or other executable code stored on a computer readable storage medium. Other embodiments may include similar or equivalent means for tapping calibration data.

A means for detecting a variation between tapped calibration data and a calibration data pattern, in various embodiments, may include a calibration component 150, a calibration circuit 304, an adjustment circuit 306, a data buffer 412, an on-die controller 220, a die state machine 222, a device controller 126, a processor, a host computing device 110, a device driver, other logic hardware, and/or other executable code stored on a computer readable storage medium. Other embodiments may include similar or equivalent means for detecting a variation.

A means for adjusting a delay of an active data path 402 based on a detected variation, in various embodiments, may include a calibration component 150, an adjustment circuit 306, a repeater 410 or other delay element, a receiver 406, a driver 408, a data buffer 412, other logic hardware, and/or other executable code stored on a computer readable storage medium. Other embodiments may include similar or equivalent means for adjusting a delay.

A means for detecting different variations in different active data paths 402a-n of a plurality of active data paths 402a-n, in various embodiments, may include a calibration component 150, a calibration circuit 304, an adjustment circuit 306, a data buffer 412, an on-die controller 220, a die state machine 222, a device controller 126, a processor, a host computing device 110, a device driver, other logic hardware, and/or other executable code stored on a computer readable storage medium. Other embodiments may include similar or equivalent means for detecting different variations.

A means for making different adjustments to delays of different active data paths 402a-n based on different variations, in various embodiments, may include a calibration component 150, an adjustment circuit 306, a repeater 410 or other delay element, a receiver 406, a driver 408, a data buffer 412, other logic hardware, and/or other executable code stored on a computer readable storage medium. Other embodiments may include similar or equivalent means for making different adjustments to delays of different active data paths 402a-n.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
an integrated circuit device;
an on-die controller disposed on the integrated circuit device, the on-die controller comprising:
a calibration circuit that receives data from an active data path of the integrated circuit device and detects a variation in the received data from a calibration data pattern; and
an adjustment circuit that reduces a delay of the active data path of the integrated circuit device in response to detection of a first variation in the received data and that increases the delay of the active data path of the integrated circuit device in response to detection of a second variation in the received data, wherein the adjustment circuit comprises a digital-to-analog converter that provides an identifier of the delay to a repeater in the data path that introduces the delay, wherein the digital-to-analog converter is configured as an up/down counter that the adjustment circuit down counts to reduce the delay and up counts to increase the delay, wherein the calibration circuit receives the calibration data pattern repeated a number of times, the number of times selected based on a number of bits of the up/down counter.

2. The apparatus of claim 1, wherein the active data path extends between one or more input/output electrical contacts of the integrated circuit device and a data buffer for a memory medium of the integrated circuit device, the calibration circuit receiving the data from the data buffer.

3. The apparatus of claim 1, wherein the calibration circuit receives the data from each of a plurality of active data paths between a plurality of different input/output electrical contacts of the integrated circuit device and a data buffer for an array of memory cells of the integrated circuit device and the adjustment circuit independently adjusts delays for the plurality of active data paths, the plurality of active data paths comprising the active data path.

4. The apparatus of claim 1, wherein the calibration circuit receives the data in response to a calibration command from a device controller for the integrated circuit device.

5. The apparatus of claim 4, further comprising a plurality of additional integrated circuit devices, the device controller sending the calibration command to the integrated circuit device and the plurality of additional integrated circuit devices in parallel.

6. The apparatus of claim 4, wherein the device controller sends the calibration command in response to a startup operation for the integrated circuit device.

7. The apparatus of claim 1, wherein the first variation in the received data comprises detecting a binary zero on a predefined clock edge and a binary one on a different clock edge and the second variation comprises detecting a binary one on the predefined clock edge.

8. The apparatus of claim 7, wherein the predefined clock edge comprises an initial rising clock edge of the received data and the different clock edge comprises a next rising clock edge of the received data after the initial rising clock edge.

9. The apparatus of claim 1, wherein reducing the delay increases a setup time for the data path and increasing the delay increases a hold time for the data path.

10. The apparatus of claim 1, wherein the calibration circuit provides the adjustment circuit a pulse signal and an up/down signal in a first state in response to detecting the first variation such that the adjustment circuit down counts the up/down counter and the calibration circuit provides the adjustment circuit a pulse signal and an up/down signal in a second state in response to detecting the second variation such that the adjustment circuit up counts the up/down counter.

11. The apparatus of claim 1, wherein the data received by the calibration circuit comprises the calibration data pattern and a clock signal.

12. The apparatus of claim 1, wherein the integrated circuit device comprises a non-volatile memory device.

13. The apparatus of claim 1, wherein the integrated circuit device comprises a 3D NAND memory.

14. A system comprising:
a device controller configured to send a calibration command and calibration data; and
a memory die in communication with the device controller, the memory die comprising different active data paths between different input/output pads and a memory buffer and configured to tap the memory buffer to detect different variations in the calibration data from the different active data paths and to make different delay adjustments to the different active data paths based on the detected different variations, wherein the different active data paths comprise repeaters configured to provide the different delay adjustments to the different active data paths based on signals from up/down counters tracking the detected different variations in the calibration data and the device controller repeats sending of the calibration data a number of times, the number of times selected based on a number of bits of the up/down counters.

15. The system of claim 14, wherein the memory die comprises a clock divider circuit configured to divide a clock signal from the device controller such that the divided clock signal has a single clock cycle for each repetition of the calibration data and the memory die configured to detect the different variations in response to the single clock cycle.

16. The system of claim 14, wherein the memory die comprises a non-volatile memory die.

17. The system of claim 14, wherein the memory die comprises a 3D NAND memory.

18. An apparatus comprising:
means for tapping calibration data from a data buffer at an end of an active data path of a memory device in response to a calibration command;
means for detecting a variation between the tapped calibration data and a calibration data pattern; and
means for adjusting a delay of the active data path based on the detected variation, the means for adjusting the delay reduces the delay of the active data path of the memory device in response to detection of a first variation between the tapped calibration data and the calibration data pattern and that increases the delay of the active data path of the memory device in response to detection of a second variation between the tapped calibration data and the calibration data pattern, wherein the means for adjusting the delay comprises a digital-to-analog converter that provides an identifier of the delay to a repeater in the data path that introduces the delay, wherein the digital-to-analog converter is configured as an up/down counter that down counts to reduce the delay and up counts to increase the delay, wherein the means for adjusting the delay receives the calibration data pattern repeated a number of times, the number of times selected based on a number of bits of the up/down counter.

19. The apparatus of claim 18, wherein the tapped calibration data comprises calibration data for a plurality of active data paths of the memory device between input/output contacts of the memory device and the data buffer.

20. The apparatus of claim 19, wherein the means for detecting comprises means for detecting different variations in different active data paths of the plurality of active data paths and the means for adjusting comprises means for making different adjustments to delays of the different active data paths based on the different variations.

* * * * *